Aug. 25, 1925.
T. M. FOSS
1,551,382
EMERGENCY RIVET
Filed April 1, 1925
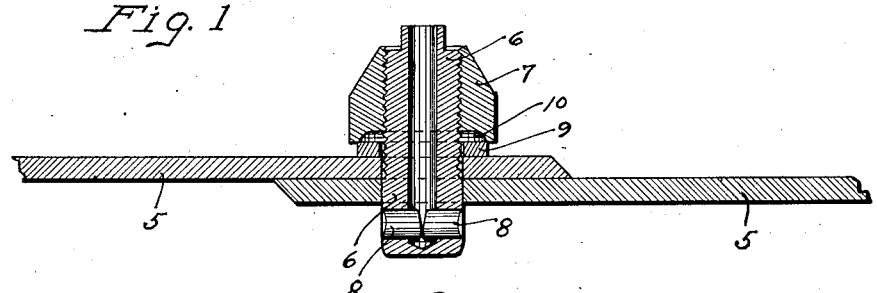
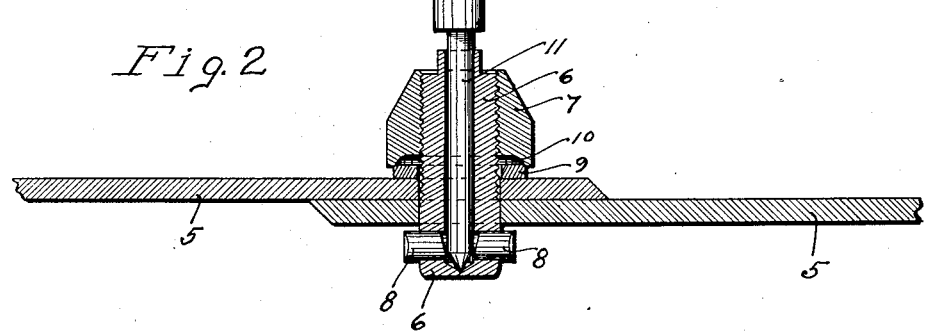
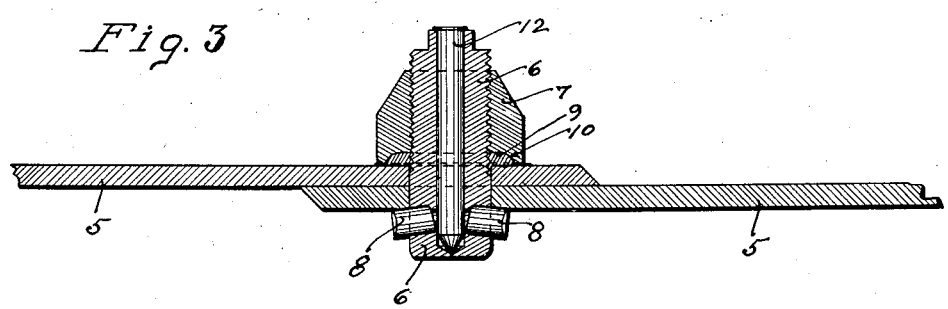
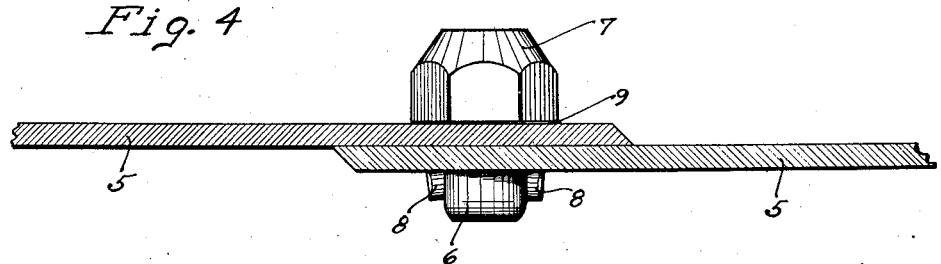
Inventor
Thomas Martin Foss
By his Attorneys Patented Aug. 25, 1925.

1,551,382

UNITED STATES PATENT OFFICE.

THOMAS MARTIN FOSS, OF MINNEAPOLIS, MINNESOTA, ASSIGNOR OF ONE-THIRD TO BERNARD L. GROGAN, OF MINNEAPOLIS, MINNESOTA.

EMERGENCY RIVET.

Application filed April 1, 1925. Serial No. 19,855.

*To all whom it may concern:*

Be it known that I, THOMAS MARTIN FOSS, a citizen of the United States, residing at Minneapolis, in the county of Hennepin and State of Minnesota, have invented certain new and useful Improvements in Emergency Rivets; and I do hereby declare the following to be a full, clear, and exact description of the invention, such as will enable others skilled in the art to which it appertains to make and use the same.

My invention provides what may be designated as an "emergency" rivet, but which rivet, nevertheless, is capable of very general use. Generally stated, the invention consists of the novel devices and combinations of devices hereinafter described and defined in the claims.

This improved rivet may be very quickly applied and tightened, and when tightened, it has a very powerful clamping action, such as will pull the tank or boiler sheets tightly together. The rivet is, therefore, efficient for use wherever a very strong rivet of powerful clamping action is desired.

In the accompanying drawings, which illustrate the invention, like characters indicate like parts throughout the several views.

Referring to the drawings:

Figs. 1, 2 and 3 show the rivet in axial section and the tank or boiler sheets in horizontal section; and Fig. 4 shows the rivet in plan and the tank or boiler sheets in horizontal section.

The tank or boiler sheets are indicated by the numeral 5. The rivet body 6 is of cylindrical form, its insertable end being smooth and adapted to fit the rivet hole preferably under light driving pressure. The outer end of the rivet body 6 is threaded and provided with a nut 7, preferably a hexagonal nut chamfered to give a finished appearance. The rivet body 6 is hollow from its outer end inward, but is closed at its inner end and in its inner or insertable end is mounted a pair of pin-like anchoring lugs 8, the outer ends of which are normally flush with the exterior of said body, as shown in Fig. 1. Quite loosely placed around the threaded intermediate portion of the rivet body 6 is a washer 9. The rivet body 6 and nut 7 will preferably be of steel, while the washer 9 will be of a much softer metal, such as copper or lead. The nut 7, on its inner or working face, is provided with a recess 10, the outer wall of which flares and preferably is of slightly less diameter than the exterior of the washer 9.

When the parts of the rivet are assembled as shown in Fig. 1, the rivet body is adapted to be inserted through the rivet hole, as shown in said view. Then, by the use of a pointed driving tool 11 inserted through the bore of the rivet body 6, the anchoring lugs 8 may be driven outward, as shown in Fig. 2. This, as is obvious, projects the anchoring lugs so that the rivet cannot be withdrawn from the rivet hole, and then the nut 7 should be tightened as shown in Fig. 3. When the nut is tightened, the pliable washer 9 will be upset and distorted and forced into tight engagement with the adjacent threads of the rivet body, thereby forming a fluid-tight joint.

There will usually be a little surplus of metal in the washer and this will be caused to flow in a thin film between the outer edge of the nut 7 and the adjacent face of the boiler or tank sheet, thereby forming a very tight joint. By reference to Fig. 3, it will be noted that, under the powerful drawing action of the nut 7, the anchoring lugs 8 have been slightly tilted, but, as is evident, they will firmly hold and the tank or boiler sheets will be so tightly drawn together as to form a fluid-tight joint between the two sheets. When the rivet has been tightened as shown in Fig. 3, a tight-fitting sealing pin 12 will be driven into the bore of the rivet body 6, thereby sealing the axial passage through the same. Preferably, this sealing pin is driven in between the two anchoring lugs, as shown in Fig. 3. After this has been done, the outer end of the rivet may be finished by sawing or filing off that portion of the rivet body 6 and pin 12 that are outward of the nut 7. This gives a finished rivet that will appear as shown in Fig. 4.

This so-called rivet, either in the form illustrated or in modified forms, is capable of use as an efficient fluid-tight lug bolt.

What I claim is:

1. A rivet comprising a hollow rivet body closed at its insertable end and provided with radially projectible anchoring lugs, a nut having threaded engagement with the outer end of said rivet body and formed with a recessed working face, and a pliable washer applied around said rivet body and arranged to be upset and compressed within the recessed face of said nut.

2. A rivet comprising a hollow rivet body closed at its insertable end and provided with radially projectible anchoring lugs, a nut having threaded engagement with the outer end of said rivet body and formed with a recessed working face, a pliable washer applied around said rivet body and arranged to be upset and compressed within the recessed face of said nut, and a sealing pin tightly driven into the bore of said rivet body.

3. A rivet comprising a hollow rivet body closed at its insertable end and provided with radially projectible anchoring lugs, a nut having threaded engagement with the outer end of said rivet body and formed with a recessed working face, a pliable washer applied around said rivet body and arranged to be upset and compressed within the recessed face of said nut, and a sealing pin tightly driven into the bore of said rivet body, the inner end of said sealing pin being inserted between the projected anchoring lugs.

4. A rivet comprising a hollow rivet body closed at its insertable end and provided with radially projectible anchoring lugs, a nut having threaded engagement with the outer end of said rivet body and formed with a recessed working face, and a pliable washer applied around said rivet body and arranged to be upset and compressed within the recessed face of said nut, said pliable washer having a normal diameter slightly greater than that of the recess in said nut.

5. A rivet comprising a hollow rivet body closed at its insertable end and provided with radially projectible anchoring lugs, a nut having threaded engagement with the outer end of said rivet body and formed with a recessed working face, and a pliable washer applied around said rivet body and arranged to be upset and compressed within the recessed face of said nut, said pliable washer having a normal diameter slightly greater than that of the recess in said nut, and said washer adapted to have a film-like portion compressed between the rim of the nut and the adjacent sheet.

In testimony whereof I affix my signature.

THOMAS MARTIN FOSS.